June 9, 1942.  W. S. SAUNDERS ET AL  2,285,616
ADJUSTABLE SUPPORT
Filed May 23, 1940   2 Sheets-Sheet 1

INVENTORS
WALTER S. SAUNDERS
BY  RAY R. PETERSON
ATTORNEYS

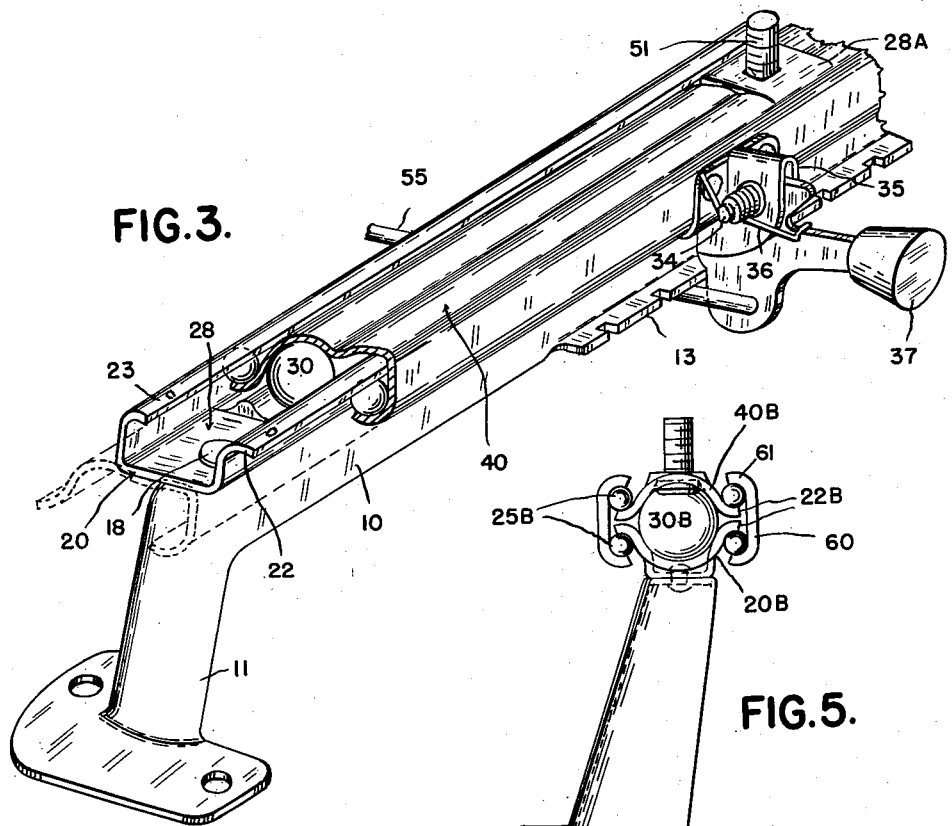
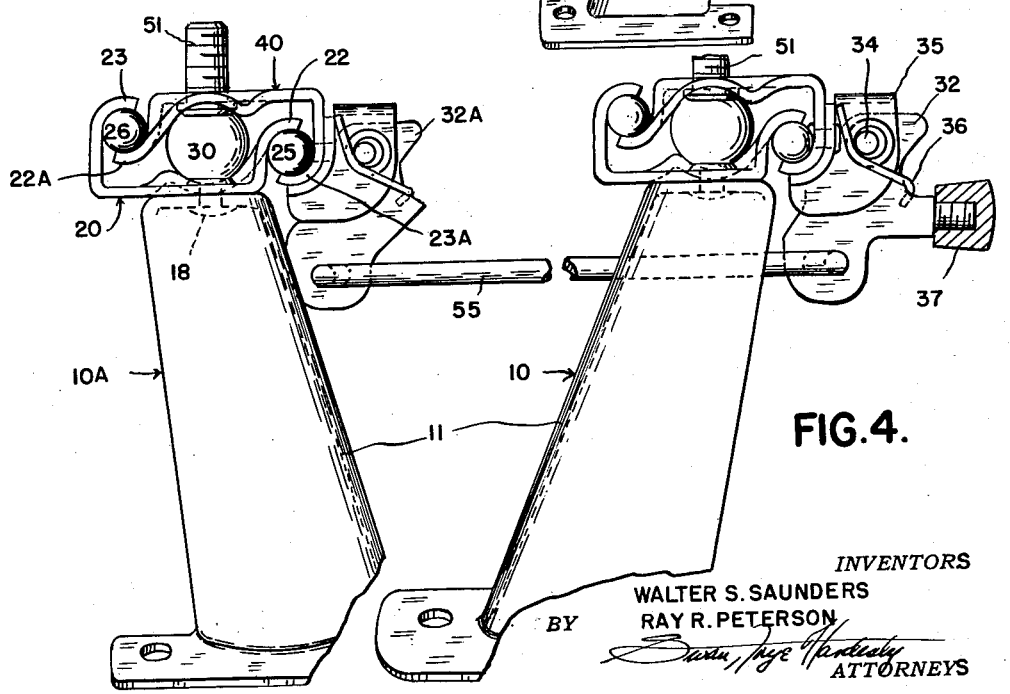

Patented June 9, 1942

2,285,616

UNITED STATES PATENT OFFICE 2,285,616

ADJUSTABLE SUPPORT

Walter S. Saunders and Ray R. Peterson, Pontiac, Mich., assignors to American Forging & Socket Company, Pontiac, Mich., a corporation of Michigan Application May 23, 1940, Serial No. 336,771

4 Claims. (Cl. 155—14)

This invention relates to adjustable supporting assemblies, particularly for the seats of vehicles, although the principles of the invention will be seen to be applicable to the construction of supports intended for other uses.

A primary object of the invention is to provide improved and very efficient supporting mechanism adapted to rigidly support loads which are of considerable mass, with relation to the mass of the supporting mechanism itself, under such trying conditions as are encountered in vehicular seat installations, where severe vibration and shock loads, heavy stresses in all directions, and the interfering action of dirt and dust are to be expected, yet rattling or lost motion cannot be tolerated, and the seat or other load must be instantly and easily adjustable to new positions, even after long periods of non-use of the adjusting mechanism.

An important object of the invention is, also, to provide such a supporting structure which is of simple, inexpensive sheet metal construction, which holds the load firmly against all possibility of unwanted movement, rattling and vibration, yet which is so designed as to permit quick and easy release of the load, and movement thereof to a new position of adjustment, whereafter the mechanism automatically locks itself, to retain the load in the new position with equal rigidity. While many supporting devices of this general class have in the past been developed and patented, the present invention is believed to attain greater rigidity, greater freedom from rattling and "drifting" of the seat, and lighter and less expensive construction of the supporting mechanism itself, than has heretofore been possible in a structure of comparable capacity.

Another object of the invention is to provide such a supporting mechanism having track portions and carriage portions which are of identical construction, and which constitute simple sheet metal sections, which may be rolled, pressed, or otherwise economically formed from the same rolls or dies.

A further object is to incorporate anti-friction means in the form of simple balls, interposed between the track and carriage portions, to enable very easy movement of the latter, the parts being so initially stressed in assembly that all clearance and lost motion between the relatively moving parts are permanently eliminated.

Other objects and advantages will be apparent from the following description, wherein reference is made to the accompanying drawings illustrating preferred embodiments of our invention and wherein similar reference numerals designate similar parts throughout the several views.

In the drawings:

Figure 3 is a perspective view of the same.

Figure 4 is a front elevational view of a pair of such supporting assemblies interconnected to support a seat, in the manner in which they are ordinarily arranged in use, and Figure 5 is a front elevational view of a somewhat modified construction.

Figure 1:
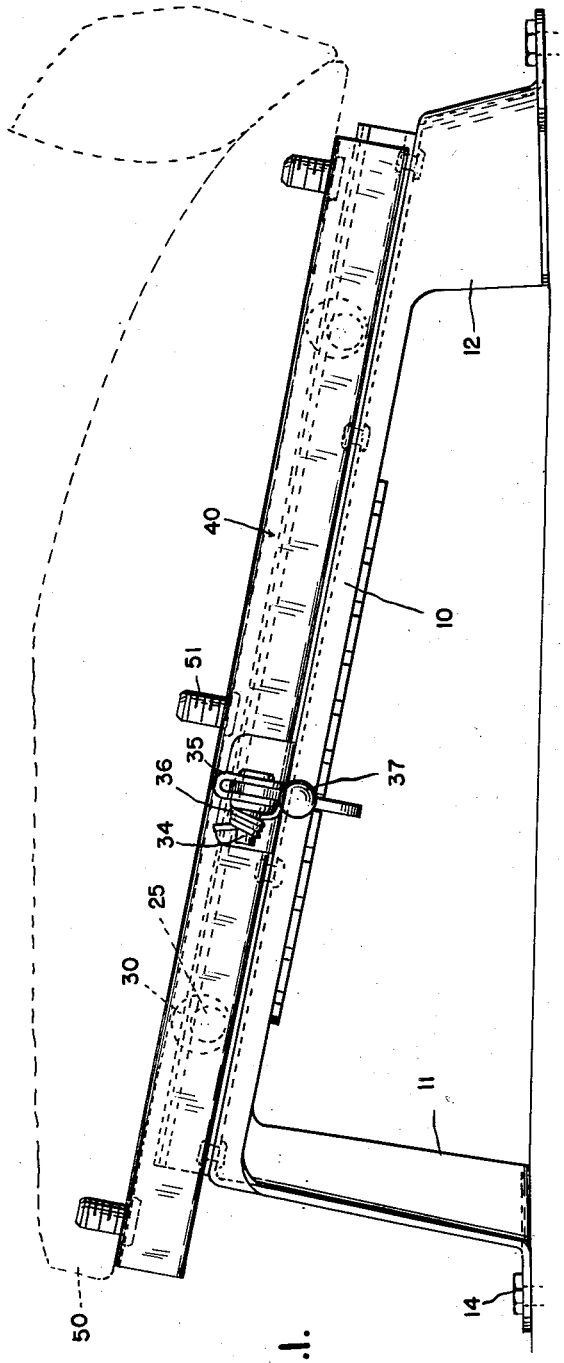
Figure 1 is a side elevational view of a seat support constructed in accordance with the present invention.
Figure 2:
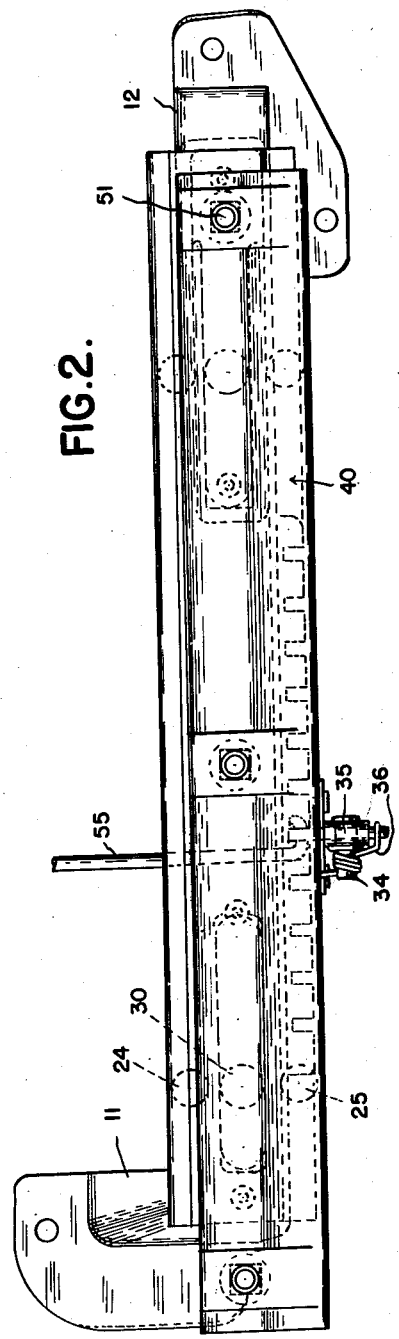
Figure 2 is a plan view thereof.

Referring now to the drawings, reference character 10 designates generally a supporting bracket, which may be pressed out of sheet metal, as shown, and provided with front and back legs 11—12 respectively, adapted to be secured to the floor as by screws 14. The front leg being somewhat higher than the back, the supporting mechanism is held in such position that not only is the front of the seat elevated, but the seat rises as it is moved forwardly on the adjusting mechanism, and sinks as it is moved to the rear.

Secured to the top of the bracket 10, as by means of rivets 18, is a sheet metal track generally designated 20. The track is of channeled form, one of its side webs, however, being higher than the other. At the upper extremity of each side web, latterly curved flanges 22—23 are provided, shaped to form raceways for anti-friction balls 25—26. The race flanges 22, 23 are bent in the same direction, as best shown in Figure 4, so that raceway 23 overlies the interior of the channeled track, while raceway 22 projects laterally therefrom. Near the ends of the track channel, flat lands are provided in the bottom web, and through these the rivets 18 are passed to firmly attach the track to the bracket. The mid section of the bottom web of the track is formed to provide a round bottomed channel of slightly greater radius than the anti-friction balls 30 which travel therein. Balls 30 rollably support the carriage 40, to which the seat, as 50, or other load, is attached.

The carriage also comprises a sheet metal, generally channel-shaped element. This may in fact be identical with the track, but as best shown in Figure 4, is inverted and turned 180° with respect thereto, about a vertical axis. The race-forming flanges of the track and carriage are so interfitted that the deeper flange of the carriage underlies the shallow flange of the track, while the shallower flange of the carriage underlies the higher flange of the track, and the corresponding raceway portions 22A, 23A cooperate with flanges 22, 23 to retain the interposed balls 25, 26. The similar flat lands 28A near the ends of the carriage accommodate studs 51 by which the seat is adapted to be attached.

The anti-friction balls are somewhat larger than the relaxed distance between the parts, so that the track and carriage portions are somewhat strained when the balls are in position. The flexure is insufficient to interfere with easy operation of the parts, but eliminates all clearance and lost motion therebetween, tending to bend the side webs of the track and carriage channels toward one another, thereby deepening the channel and reducing its radius so that it conforms more nearly to the radius of the central balls 30. The side portions which carry the webs 22, 22A are of generally stepped or S-form, although they may be curved in substantial conformity to the balls, as shown. The sides of these step-like flanges cooperate to form the side portions of the central channel for balls 30, engaging the balls snugly on the sides so that positively interlocked engagement of the assembled parts is provided to hold the track and carriage against lateral as well as vertical movement with relation to each other.

It will of course be appreciated by those skilled in the art that two complete supporting devices, such as has been described, would ordinarily be employed to carry a seat, one complete assembly being located beneath each end of the seat. In present practice, customarily, a locking device is incorporated with only one of the two assemblies thus used, and through some suitable cross-connecting means the locking effect is transferred to the other assembly. In our improved arrangement, however, separate locking means is incorporated in each support, and means is provided whereby the locking means of both supports may be operated simultaneously, or, if desired, more than two supporting assemblies may be used, and the locking means of all may be operated at once. The seat or other supported object is thus positively locked against movement at each support, and the rigidity of mounting is thereby considerably increased.

The relative arrangement of two of our supporting devices, as used to support a seat, is shown in Figure 4, although the link 55 by which the remotely located locking means is actuated is centrally broken away, to permit the supports to be shown closer together than they would actually be placed, for conservation of space.

A serially notched flange 13 projects laterally from one edge of each supporting floor bracket 10, while a locking dog 32 is pivoted upon a pin 34 carried by a bracket 35 attached to the side of the carriage, the dog being swingable about a longitudinal axis, to and from cooperative holding engagement with the notches in the flange 13. A torsion spring 36 wrapped about the pin 34 and bearing against the dog normally holds the latter in locked position. In vehicular seat installations, a knob 37 is attached to the dog of that assembly which is to be positioned beneath the driver's end of the seat, while the link 55 is articulated to the downwardly projecting lower ends of the dogs of the two assemblies, and extends beneath the floor brackets to cause the two dogs to swing together as the knob is manipulated. When in their normal locked positions, the dogs thus positively hold both ends of the seat against movement. The locking dog 32A of the remotely operated unit may differ from the dog 32 of the directly operated unit by omission of the mounting means for the knob, as shown, although this is not essential, and identical dogs may be employed if desired, the knob being simply omitted from the remotely operated unit. The floor bracket 10A of the remotely operated unit may also be inclined oppositely to the floor bracket 10 of the directly operated unit, for bracing, as brought out in Figure 4, although this again is a matter of choice in view of the engineering considerations involved in the particular installation, and these, like the other parts of the two assemblies, may if desired be identical in construction.

It will be observed that while in the past it has been considered necessary, in constructing supports of this class, to provide right-hand and left-hand supporting assemblies of complementarily opposite construction, the two assemblies of our improved type used in seat supporting installations may be substantially or completely identical, without sacrifice of strength or efficiency; and while, further, it has also been regarded as necessary to use track portions and carriage portions of different construction, our invention makes possible the use of identical track and carriage portions, thereby effecting still further economies in construction, and in the tools and dies used in construction of these devices, as well as in the assembly, installation, packaging and handling thereof.

A somewhat modified construction, shown in Figure 5, also employs track and carriage portions which are identical with each other, and identical in the right-hand and left-hand support assemblies. In this embodiment the track channel 20B is of approximately semi-circular cross section, as also is the carriage channel 40B, both edges of each channel being provided with outturned curved raceway flanges 22B. Large balls 30B are arranged between the track and carriage channels to insure free movement of the latter, and sheet metal ball retainers 60, also of generally channeled form, extend along the sides of the assembly and are provided with inturned and suitably curved flanges 61 adapted to retain and serve as raceways for balls 25B. Balls 25B are of such size with relation to the distances between the raceways as to somewhat strain the flanges 22B, forcing them together sufficiently to take up all clearance between the parts without, however, unduly interfering with freedom of movement of the carriage.

We are aware that the invention may be embodied in other specific forms without departing from the spirit or essential attributes thereof, and we therefore desire the present embodiments to be considered in all respects as illustrative and not restrictive; reference being had to the appended claims rather than to the foregoing description to indicate the scope of the invention.

We claim:

1. In a slidable support for a seat or the like, a track having a pair of spaced upwardly projecting sides and a channel portion therebetween, a laterally extending race-forming flange projecting from each of said sides, said flanges extending in the same direction, whereby one overhangs said channel portion and the other projects laterally therefrom, a carriage shaped similarly to the track and inverted and turned one hundred eighty degrees with relation thereto, each race-forming flange of the carriage underhanging the other of the two corresponding race-forming flanges of the track, and the channel portions of said track and carriage being substantially vertically aligned to provide a central raceway, anti-friction members in said central raceway, and anti-friction members between each of said first mentioned race-forming flanges and the cooperating underhanging flange, said last mentioned anti-friction members being somewhat larger than the relaxed distance between said flanges, whereby to impose predetermined stress upon said flanges and to urge said track and carriage together and clamp the first-mentioned anti-friction members therebetween.

2. In a slidable support for a seat or the like, a track member having a medial longitudinal channel and a race-forming flange on either side thereof, and projecting upwardly and laterally therefrom, a carriage member similar in form to the track member and also having a medial longitudinal channel aligned with said channel of the track member and cooperating therewith to form an inner raceway, said carriage member having corresponding race-forming flanges projecting downwardly and laterally therefrom and aligned with the race-forming flanges of the track member, both race-forming flanges of the track member projecting in one direction and both race-forming flanges of the carriage member projecting in the opposite direction, the race-forming flanges of the carriage member underhanging those of the track member, means including balls in said race-forming flanges preventing separation of said members, and balls in said inner raceway and somewhat greater in diameter than the relaxed distance between said cooperating channels, whereby to impose predetermined stress upon said track and carriage members and take up clearance between said members and balls.

3. A supporting device as set forth in claim 2 in which one of the race-forming flanges of the carriage member projects downwardly farther than the other, to an extent slightly less than the diameters of the balls therein, and one of the race-forming flanges of the track member extends upwardly farther than the other to a like extent.

4. A supporting device as set forth in claim 2 in which at least one race-forming flange of each member is of generally stepped cross section, and one flange of the track member and one flange of the carriage member cooperate to form the sides of said inner raceway, the balls in said inner raceway being closely confined between said side portions.

WALTER S. SAUNDERS.
RAY R. PETERSON.